(12) United States Patent
Angermann et al.

(10) Patent No.: US 12,179,527 B2
(45) Date of Patent: Dec. 31, 2024

(54) TRAILER HITCH AND METHOD FOR PRODUCING SAME

(71) Applicant: WESTFALIA-AUTOMOTIVE GMBH, Rheda-Wiedenbrück (DE)

(72) Inventors: Kai Angermann, Dobeln (DE); Martin Wyrwich, Rheda-Wiedenbruck (DE)

(73) Assignee: Westfalia-Automotive GMBH, Rheda-Wiedenbrück (DE)

( * ) Notice: Subject to any disclaimer, the term of this patent is extended or adjusted under 35 U.S.C. 154(b) by 740 days.

(21) Appl. No.: 17/312,080

(22) PCT Filed: Dec. 11, 2019

(86) PCT No.: PCT/EP2019/084747
§ 371 (c)(1),
(2) Date: Jun. 9, 2021

(87) PCT Pub. No.: WO2020/120621
PCT Pub. Date: Jun. 18, 2020

(65) Prior Publication Data
US 2022/0024267 A1    Jan. 27, 2022

(30) Foreign Application Priority Data

Dec. 12, 2018   (DE) .................... 10 2018 132 012.4
Mar. 12, 2019   (DE) .................... 10 2019 106 223.3

(51) Int. Cl.
*B60D 1/06*    (2006.01)
*B60D 1/54*    (2006.01)

(52) U.S. Cl.
CPC . *B60D 1/06* (2013.01); *B60D 1/54* (2013.01)

(58) Field of Classification Search
CPC ....................................................... B62D 1/06
See application file for complete search history.

(56) References Cited

U.S. PATENT DOCUMENTS

| 6,053,521 A | 4/2000 | Schertler |
| 2013/0071175 A1 | 3/2013 | Adamczyk et al. |

FOREIGN PATENT DOCUMENTS

| CN | 101208210 | 6/2008 |
| CN | 102357710 | 2/2012 |
| CN | 102996618 A | 3/2013 |
| DE | 10059693 | 6/2002 |

(Continued)

OTHER PUBLICATIONS

Patent Cooperation Treaty (PCT), International Search Report and Written Opinion for Application PCT/EP2019/084747 filed on Dec. 11, 2019, mailed Mar. 19, 2020, International Searching Authority, EP.

*Primary Examiner* — Kevin Hurley (57) ABSTRACT

A trailer hitch for a motor vehicle comprises a coupling arm, on one end region of which a coupling body, in particular a coupling ball, is arranged for hitching a trailer or coupling a load carrier to the motor vehicle. At least one support element forming at least part of an outer surface of the coupling body and/or of the coupling arm is provided on the coupling body and/or on the coupling arm, said support element having a greater strength and/or hardness than an in particular metal basic material of a main body of the coupling body or coupling arm on which the support element is arranged or which bears the support element.

34 Claims, 3 Drawing Sheets

(56) References Cited

FOREIGN PATENT DOCUMENTS

| | | | |
|---|---|---|---|
| DE | 10059693 A1 * | 6/2002 | ............... B60D 1/06 |
| DE | 102014110519 | 1/2016 | |
| DE | 102017117168 | 8/2018 | |
| EP | 0646482 | 4/1995 | |
| EP | 2353892 | 8/2011 | |
| WO | 2018046658 | 3/2018 | |

* cited by examiner

TRAILER HITCH AND METHOD FOR PRODUCING SAME

CROSS-REFERENCE TO RELATED APPLICATION

This application is a 35 U.S.C. § 371 national stage application of PCT Application No. PCT/EP2019/084747 filed on Dec. 11, 2019, entitled "TRAILER HITCH AND METHOD FOR PRODUCING SAME," which claims priority to German Patent Application No. 10 2018 132 012.4 filed on Dec. 12, 2018, and German Patent Application No. 10 2019 106 223.3 Filed on Mar. 12, 2019, each of which are incorporated herein in their entirety by reference.

The invention relates to a trailer hitch for a motor vehicle, with the trailer hitch having a coupling arm on the one end region of which a coupling body, in particular a coupling ball, is arranged for hitching a trailer or coupling a load carrier to the motor vehicle.

The coupling arm, when in use, protrudes in front of the vehicle for example at the rear such that a load carrier or trailer can be coupled. In general, the coupling piece of a coupling ball, about which the trailer pivots with its so-called ball coupling in a spherically pivoting manner. The trailer hitch must withstand the most varied of loads in practice, such as e.g. dynamic vibrations, high tensile loads or pressure loads and the like. Accordingly, the basic material of the coupling arm and the coupling ball is selected such that a certain ductility or elasticity is present. On the other hand, there is the requirement to provide a high load-bearing capacity, in particular a high load-bearing capacity with respect to frictional loads, which is why it is advantageous per se to produce the coupling body, in particular the coupling ball, from a harder, more brittle material. In the case of greater wear resistance, however, the risk is high of a harder or stronger material breaking when the load exceeds a predetermined amount.

It is therefore the object of the present invention to provide a mechanically loadable trailer hitch.

In order to achieve the object, in the case of a trailer hitch of the type mentioned at the outset, at least one support element forming at least one part of a respective outer surface of the coupling body and/or of the coupling arm is provided on the coupling body and/or the coupling arm, said support element, in particular its material, having a greater strength and/or hardness than an in particular metal basic material of a main body of the coupling body or coupling arm on which the support element is arranged or which bears the support element.

The invention thus relates to a trailer hitch with a coupling arm on the free end region of which a coupling piece is arranged for coupling a trailer or a load carrier, with the coupling piece having a coupling piece main body and the coupling arm a coupling arm main body, characterised in that the coupling piece and/or the coupling arm has at least one stronger surface region, whose strength is greater than that of a basic material, in particular of a metal, of the coupling piece main body and of the coupling arm main body.

The coupling arm has on its one end region the coupling body, on an end region opposite thereto for example a fastening element for fastening on the motor vehicle. The fastening element for example comprises means for detachably fastening on the motor vehicle, for example a push-in projection, which is insertable into a push-in receptacle of a holder, which is fastened or fastenable on the motor vehicle. Furthermore, the fastening element can be arranged on a bearing for movably mounting the coupling arm between a position of use and a position of non-use or can have a bearing part of such a bearing. In the position of use, the coupling arm for example protrudes further in front of the tail of the motor vehicle than in the position of non-use. The position of use is provided for coupling a load carrier or trailer. In the position of non-use, the coupling arm is preferably concealed behind and/or under a bumper of the motor vehicle or at least substantially concealed.

The trailer hitch preferably comprises a carrier arrangement for fastening on a body of the motor vehicle. The carrier arrangement for example comprises a crossbeam which is preferably connected with lateral beams to the motor vehicle. The coupling arm is arranged for example fixedly or detachably, for example by means of a push-in holder, or movably, for example pivotable between the position of use and the position of non-use on the crossbeam or the carrier arrangement.

It is a fundamental idea of the present invention that the main body of the coupling body or the coupling arm or both do not have to consist of a strong or hard material, but rather one or a plurality of support elements are provided specifically where high loads, for example wear by friction, in particular of a coupling device of the trailer or the load carrier, occur on the coupling body or the like. The main body of coupling arm and coupling ball can for example consist of metal, in particular of a metal with a predetermined ductility and/or strength and/or hardness. The support element has e.g. a lower ductility and/or higher strength and/or greater hardness compared to the main body of the coupling arm and coupling ball. Therefore the invention makes provision for a harder and/or stronger material than the basic material of the main body to be used specifically at the points which are exposed to particularly high loads, namely in the region of the at least one support element.

A plurality of support elements are, of course, possible at the respectively desired sites.

Furthermore, in the case of the support elements, different configurations are possible which will become clear in the detail.

In order to form the support element, the basic material in the region of the at least one support element is for example reinforced and/or hardened. Therefore virtually no material change occurs, but rather the basic material of the main body of coupling arm and/or coupling body present per se is targetedly reinforced or hardened or both.

The basic material is for example hardened in the region of the at least one support element, with thermal hardening, inductive hardening, laser hardening or the like readily being possibly individually or in combination.

The basic material in the region of the at least one support element is for example first heated and then cooled, in particular cooled suddenly. The initially heated support element is for example cooled by water or oil within a predetermined time to a predetermined temperature. After the cooling phase, the region of the at least one support element is then heated again by a predetermined amount which is also called annealing.

It is advantageous that the basic material in the region of the at least one support element is a basic material heated starting from a starting temperature or nominal temperature, for example a typical ambient temperature of approx. 15 to 35° C., to a first temperature, which is higher than the starting temperature, and cooled to a second temperature, which is lower than the first temperature. The second temperature is for example again as high roughly as the ambient temperature or slightly higher. Therefore, the basic material is for example heated and then cold-quenched again and hardened as a result. The first temperature is in the range of for example more than 100° C., for example 500 to 1300° C., the third temperature e.g. in the range of 200 to 350° C.

The basic material of the support element is preferably a material which, after cooling to the second temperature, has been heated to a third temperature, which is higher than the second temperature, but lower than the first temperature. The last step of the reheating process for example corresponds to the above-mentioned annealing.

A reinforcement or hardening of the at least one support element can, however, also be accomplished by mechanical action, in particular a pulsed or striking mechanical action, in order to form the support element. It is particularly favourable when the support element is formed by shot peening, rolling, milling or combinations thereof.

Therefore, individual elements of the main body of coupling body or coupling arm are targetedly mechanically reinforced. The reinforcement of the at least one support element can for example take place by a cold deformation and/or hot deformation.

The support element can be produced not only by processing the basic material of the main body, but also by a so-called support body separate from the main body being used.

The at least one support element can for example be provided on a support body, which is fixedly connected to the main body of the coupling arm or coupling body and is formed from a material which has a higher strength and/or hardness than the basic material of the main body of coupling arm or coupling body. Therefore, the support body can consist of a completely different material to the basic material of the main body, for example of a different metal, in particular of a metal alloy with greater hardness and strength than the basic material of the main body. Ceramics or the like can also be readily used for the support body.

The support body comprises or is preferably a wall body, which is arranged in the manner of an outer wall on the main body and/or surrounds the main body in a shell-like manner. Furthermore, it is possible that the support body is configured as a shell body. The shell body can in particular be formed in the manner of a spherical casing. Thus, it is for example possible that the coupling body is a coupling ball, whose casing is formed in full or in part by the support body. The at least one support body can for example form a spherical casing segment.

The at least one support body is for example received in a recess of the main body.

The at least one support body and the main body of the coupling body or coupling arm preferably form the respective outer surface of coupling body or coupling arm in a complementary manner. The outer surface elements of the support body and of the main body are for example arranged next to one another and/or adjoin one another. In particular, the outer surface elements of support body and main body preferably merge into one another in a stepless manner. The outer surface elements of support body and main body preferably align with one another. For example, the outer surfaces of coupling body and support body form a spherical surface.

The main body of the coupling body and the support body can, however, also form the coupling body in a complementary manner. For example, the support body and the main body of the coupling body can be or have disc sections, spherical segment sections. For example, it is possible that the main body of the coupling body has a neck section or holding section to connect to the coupling arm, in particular a coupling body neck of the coupling arm. A partial ball or a spherical segment is then for example arranged on this main body. For example, the main body of the coupling body and the support body can form spherical body parts. Thus, for example a ball upper part can be provided by the support body, while a ball lower part is provided by the main body. Both the ball upper part and the ball lower part can have flattened portions. Thus, for example a spherical cap cannot be present on the ball upper part or a flattened portion can be provided on the ball upper part. In the transition from the coupling body to the coupling arm, a step can be provided, for example a planar surface or flat surface. This step or planar surface is preferably arranged on the main body.

The coupling body can be readily configured as a coupling ball, but also have other geometries, for example polygonal geometries for fastening a load carrier.

The support body is preferably connected to the main body in a materially-bonded manner, for example adhered, soldered or welded.

The support body is also preferably connected to the main body in a force-fitting manner, for example by means of undercuts, pins or the like. A screw connection of main body and support body is also readily possible. Thus, it is for example possible that a screw passes through the support body and the main body and is connected to the coupling arm.

The support body is preferably connected to the main body by means of at least one holding projection or holding pin which for example protrudes from the support body or from the main body and engages into a receptacle on the main body or support body. Thus, if for example one or a plurality of holding pins or holding projections protrude from the support body, they expediently engage into corresponding holding receptacles on the main body. The reverse configuration is also possible where one or a plurality of support projections protrude from the main body and engage into the support body.

The support body is expediently held on the main body by means of at least one undercut. The undercut is for example provided on a receptacle for a holding projection. The undercut can for example be formed by a base region of the receptacle for the holding projection which has a larger cross-section than an insert opening of the receptacle.

The undercut is preferably provided on an edge region between the support element and an outer surface element of the main body such that the support body and the main body engage into one another in a force-fitting manner. For example, the undercut comprises a groove, into which a spring or another projection of the support element engages.

The support body or the at least one support element can, however, also be formed by a coating of the main body. The coating can for example be applied by thermal spraying, a casting process or the like. Thus, a liquid ceramic material can be applied in a casting process on the main body of the coupling body or of the coupling arm.

The support element preferably comprises a ceramic material for example from the field of technical ceramics. The ceramic material can for example be fibre-reinforced. The support element can, however, also comprise or be formed by a metal alloy, in particular based on nickel/chrome.

The coupling device of the trailer or load carrier is advantageously adjustable between a locked or sealed closed position and an open position. The open position is provided for removing the coupling device of the trailer or load carrier from the coupling body. The closed position is provided for holding the coupling device on the coupling body for a drive operation of the motor vehicle with the trailer or load carrier. For example, the coupling device has a closure body, which is adjustable between the closed position and the open position or release position.

In regard to the permanently fixed hold of the coupling device of trailer or load carrier, it is advantageous when the basic material of the coupling body has a minimal cross-section which prevents removal of the locked or sealed coupling device from the coupling body. For example, an equatorial region of a spherical coupling body is provided so that the coupling device of the trailer or load carrier is not removable. In particular, the coupling device can be connected to the coupling body in the case of the load carrier in a rotationally fixed and/or fixed manner or in the case of the trailer a ball-and-socket type connection. A rear grip or undergrip of a coupling member of the coupling device is advantageously provided with the coupling body. The coupling body of the trailer hitch can then no longer be removed from a coupling receptacle of the coupling device when the coupling member is in its closed position or holding position, for which the minimal holding cross-section is provided.

The at least one support element expediently does not extend up to the minimal holding cross-section. Therefore, the hardened or stronger region is provided outside of the minimal holding cross-section such that it prevents or minimises corresponding wear of the coupling body. The minimal holding cross-section, which, in contrast, consists of the basic material of the main body, is less hard or strong, thus tends to wear to a greater extent in the case of frictional loading, but is more ductile or elastic on the other hand such that it ensures a reliable hold of the coupling device of the trailer or load carrier even when for example the support element is worn in full or in part. For example, a coating of the main body providing the support element can be removed or a support body configured as an insert piece smash. In this situation, a reliable hold of the coupling device on the coupling body is possible.

The basic material of the coupling body main body, in the region of the minimal holding cross-section, expediently forms the outer surface of the coupling body. Therefore, no support element, not even a section of the support element, is provided there.

However, a configuration is also possible, in which the support element is also located in the region of the minimal holding cross-section or at least partially covers it on the outside. Therefore, an optimal wear resistance of the coupling body is possible. Additionally, it is advantageous in this situation when the support element covers the coupling body in the region of the minimal holding cross-section on the outside with such a material thickness that the coupling body has a maximum holding cross-section, in which the coupling device of the trailer or load carrier is adjustable into a coupling position provided to hold the trailer or load carrier for a drive operation, in which the coupling body is received in a coupling receptacle of the coupling device, for example rotatable in a spherically pivoting manner in the case of the trailer or fixed in place in the case of the load carrier. For example, in the case of a so-called standard spherical coupling according to the standard "ECE-R 55 Coupling Components", the maximum diameter is 50 mm, while the minimum diameter must be 49 mm. The material thickness of the support element is in this case for example at most 0.5 mm. It is also advantageous when the main body of the coupling body has a minimally greater cross-section than the minimum measurement or than necessary for the minimum holding cross-section such that even in the case of maximum wear of the support element, a reliable holding of the coupling device of the trailer or load carrier on the coupling body is still possible.

The at least one support element advantageously comprises an upper support element on an upper side of the coupling body facing away from a connection site of the coupling body with the coupling arm, for example above a maximum cross-section of the coupling body, in particular of the aforementioned holding cross-section. The connection site is for example the transition from a coupling body neck or neck section of the coupling arm into the coupling body.

Furthermore, a lower support element is advantageously on a lower side facing a connection site of the coupling body with the coupling arm, for example below a maximum cross-section or holding cross-section of the coupling body.

Both on the upper side and on the lower side of the coupling body, one or a plurality of support elements can be provided. One single upper side support element and one single lower side support element are preferably provided in each case.

The upper support element and the lower support element are preferably arranged on the coupling body depending on an intended installed position of the coupling arm, in particular of its fastening element, on the motor vehicle.

It has been proven in practice when the upper support element is facing a longitudinal end of the coupling arm provided for fastening on the motor vehicle.

Therefore, the upper support element is for example at the front in the vehicle longitudinal direction or forwards direction of travel. The lower support element is expediently facing away from a longitudinal end of the coupling arm provided for fastening on the motor vehicle.

However, it is also possible that the upper support element is facing away from the longitudinal end of the coupling arm provided for fastening on the motor vehicle or is oriented to a free side of the trailer hitch. In this situation, it is advantageous when the lower support element is facing the longitudinal end of the coupling arm provided for fastening on the motor vehicle. An arrangement of this type is for example advantageous when the installation site of the trailer hitch is high on the motor vehicle such that a drawbar of a trailer hitched on the trailer hitch has an oblique orientation with a rising direction away from the motor vehicle when the pairing consisting of towing vehicle or motor vehicle and trailer is or drives on a common planar surface.

It may be that only one single upper and/or only one single lower support element of the aforementioned type are provided. It is preferred in particular when one single upper and one single lower support element are provided, with one support element being arranged above the equator and the other support element of a transverse central plane of the coupling body and/or below the equator of the coupling ball.

The at least one support element expediently comprises a support element on the coupling body, which extends over an angle range of maximum 70° laterally next to a longitudinal central axis or longitudinal central plane, which is parallel to a main longitudinal axis of the coupling arm or is parallel to the vehicle longitudinal axis of the motor vehicle in the state of the trailer hitch mounted on the motor vehicle. The longitudinal central plane is for example a plane at right angles to the equatorial plane in which an equator or equator region of the coupling ball is located. The longitudinal central plane is for example a vertical plane, the equatorial plane is for example a horizontal plane in the position of use of the trailer hitch, for example when it is fastened to a motor vehicle, which stands on a horizontal plane. The main longitudinal axis of the coupling arm is for example the axis which runs roughly between the longitudinal end regions of the coupling arm, with the coupling body being arranged on a longitudinal end region and the other longitudinal region serving to fasten on the motor vehicle. The main longitudinal axis of the coupling arm and/or the longitudinal central axis and/or the longitudinal central plane of the coupling body extends for example in the so-called X direction. The angle range extends, proceeding from the X direction or X axis into the direction of a Y axis, which for example runs in the vehicle transverse direction of the motor vehicle and/or transverse to the main longitudinal axis of the coupling arm, in the aforementioned angle range. The angle range is preferably provided symmetrically, i.e. that the support element extends laterally next to the longitudinal central axis of the coupling body in each case at the same angle range of for example 70°. The angle range can, however, also be smaller, for example 50°, preferably maximum 40° or only 30°. It is thus preferred when the at least one support element or all support elements is or are symmetrical in relation to the longitudinal central axis or longitudinal central plane of the coupling body. For example, such a support element extends at the same angles to opposing sides of the longitudinal central axis on the coupling body.

In particular, the aforementioned upper support element, just like the lower support element, can thus extend over such an angle range laterally next to the longitudinal central axis.

It is advantageous when the support element or the plurality of support elements provide first portions of the outer surface of the coupling body, for example of the coupling ball, which are, during operation or use of the trailer hitch, in contact with the coupled coupling device of the load carrier or of the trailer, in the case of a coupling ball, i.e. for example its spherical surface, while other portions of the outer surface of the coupling body, for example of the coupling ball, are formed by the basic material or main body of the coupling body. Therefore, parts of the spherical surface are thus strengthened by the support elements, while other parts are not strengthened.

Advantageously, first partial surfaces of a region of the outer surface of the coupling body, in particular of the coupling ball, in contact with the load carrier or trailer when the trailer hitch is in use, are formed by the basic material of the main body of the coupling body, in particular of the coupling ball, and second partial surfaces of the region of the outer surface of the coupling body, in particular of the coupling ball, in contact with the load carrier or trailer when the trailer hitch is in use, are formed by the at least one support element or an arrangement of a plurality of support elements comprising the at least one support element. The first partial surfaces can of course only be formed by a single first partial surface. Similarly, the second partial surfaces can also be formed only by a single second partial surface, for example when only a single support element is arranged on a coupling ball.

Preferably at most six, in particular at most four, particularly preferably at most two support elements are provided on the coupling body.

It is essentially possible that the at least one support element is formed in a punctiform or linear manner. However, it is advantageous in practice when the support element or support elements have a minimum surface extension or are flat. For example, the at least one support element has a flat shape and provides at least 10%, preferably at least 20%, in particular at least 30% of a region of the outer surface of the coupling body, in particular of the coupling ball, in contact with the load carrier or trailer when the trailer hitch is in use.

The total surface of the support elements can be greater or smaller than the total surface of the outer surface formed by the basic material of the coupling body. For example, a total surface extension of the second partial surfaces is smaller or greater than a total surface extension of the first partial surfaces. It is for example advantageous when the total surface extension of the second partial surfaces is at most 75%, in particular at most 60%, further preferably at most 50% of the total surface extension of the first partial surfaces.

The coupling arm advantageously has one arm body and a neck section or coupling body neck, which is arranged between the arm body and the coupling body. The coupling body neck has for example a substantially circular-cylindrical cross-section and/or a cylindrical shape. Furthermore, the already mentioned fastening element is provided on the coupling arm. The fastening element for example is used for the fixed fastening of the trailer hitch on the motor vehicle, for example a screw connection, weld connection or the like. Using a crossbeam which is to be mounted on the tail of the motor vehicle, the fastening element is for example fixedly connected, connected so as to be insertable by a push-in connection or mounted so as to be movable by means of a bearing arrangement.

In particular, it is advantageous when the coupling arm is adjustable, in particular pivotable between a position of use, in which it protrudes behind the tail of a motor vehicle for hitching the trailer or coupling the load carrier, and a position of non-use, in which it protrudes a little further in front of the tail of the motor vehicle than in the position of use. In the position of non-use, the coupling arm is for example completely or substantially concealed behind a rear apron, a bumper or the like, of the motor vehicle.

The at least one support element can, as has already been clear, also be provided on the coupling arm. The particularly loaded regions of the coupling arm are preferably reinforced here by one or a plurality of support elements.

For example the at least one support element is located on the coupling body neck and/or on an end region of the arm body bearing the coupling body neck.

The support element can have different material thicknesses. Thus, it is for example advantageous when it is smaller in a transition region to an outer surface of the main body of the coupling arm or coupling body than at a greater distance to the transition region. Thus, for example, a particularly loaded region, for example a region of the support element along the longitudinal central axis of the coupling body, can have a greater material thickness than the region of the support element, which is further remote from the longitudinal central axis. Thus, for example in the case of the aforementioned angle ranges, the so to speak outer or angled outer edge regions or edge regions furthest remote from the longitudinal central axis can have a lower material thickness than the central section of the support element in the region of the longitudinal central axis of the coupling body.

It is also possible that the coupling arm has one or a plurality of support elements. A support element on the coupling arm is for example harder or stronger in the region of its outer surface than in the direction of a cross-sectional centre of the coupling arm, for example in the region of a neutral fibre of the coupling arm. Therefore, the coupling arm is in the region of its neutral fibre or cross-sectional centre so to speak somewhat softer, while it is harder and stronger in the outer region.

The main body of coupling arm and coupling body, which can also be in one piece, are for example cast parts and/or forged parts or components manufactured by forging.

It is preferred when the arm body and coupling body neck and/or the coupling arm and the coupling body and/or the coupling body neck and the coupling body are produced in one piece and/or from a common blank.

While it is advantageous for the coupling body neck when it has a circular-shaped cross-section or is cylindrical, it is possible that the arm body has a substantially non-circular-shaped cross-section. For example, the arm body has ribbing, carrier structures or the like, which are not provided in the case of the coupling body neck.

Furthermore, it is advantageous that the arm body has a greater cross-sectional surface than the coupling body neck directly next to the coupling body neck.

The coupling ball is expediently flattened at its region facing away from the coupling body neck.

The coupling ball can expediently be configured as a spherical segment ball which in each case has a flattened portion, in particular a planar surface, on its region facing away from the coupling body neck and its region facing the coupling body neck.

The flattened portions can for example serve as positioning aids or support surfaces for a load carrier.

The coupling ball and/or the coupling body neck and/or the coupling arm are expediently produced by deformation. As deformation, in particular forging, compressing, milling or profiling are suitable. As mentioned, the deformation expediently takes place in the warm, in particular in the hot state of a blank to produce the coupling arm.

However, processing of a blank, which is cut or forged at least in sections, is also readily possible for producing the coupling body and/or the coupling arm.

Coupling arm, in particular the coupling body neck, and the coupling ball preferably consist of metal, in particular of steel or aluminium.

It is advantageous in particular when the coupling arm consists of steel or aluminium as a whole, at least in the section where it is connected to or is in one piece with the coupling body neck or the coupling ball. For example so-called structural steel, high-strength materials, for example from the group of quenched and tempered steels or precipitation-hardened ferritic-perlitic steels or AFP steels are preferred. Bainitic steels are also advantageous.

Exemplary embodiments of the invention are explained below on the basis of the drawing, wherein.

Figure 1:
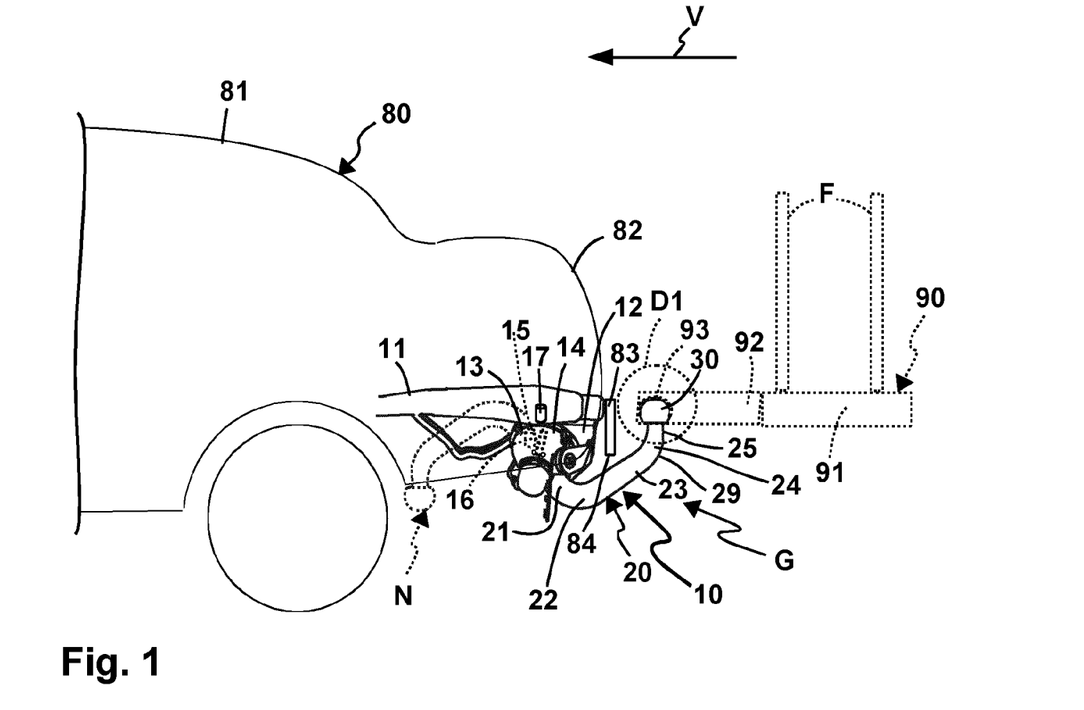
FIG. 1 shows a partially schematic side view of an arrangement, comprising a motor vehicle and a load carrier, which is arranged on a trailer hitch according to the invention.

A trailer hitch 10 is for example arranged on a motor vehicle 80. A load carrier 90 or a trailer 190 (represented schematically in FIG. 4) are coupled to the trailer hitch 10 such that for example a load, in particular bicycles F, or loads to be transported on a trailer 190, can be transported by the motor vehicle 80. The motor vehicle 80 is for example a motor vehicle with a combustion engine, electric engine or hybrid engine. In any case, the load capacity or transport capacity of the motor vehicle 80 can be increased by the load carrier 90 or a trailer 190.

The trailer hitch 10 for example comprises a carrier arrangement 11 which can be fastened to a body 81 of the motor vehicle 80. The carrier arrangement 11 for example comprises a crossbeam and lateral beams or longitudinal beams, which can be fastened, for example screwed, to the body structure of the body 81.

A holder 12 of the trailer hitch 10 is fastened to the carrier arrangement 11. The holder 12 bears a coupling arm 20 or holds a coupling arm 20. The coupling arm 20 is adjustable by means of a bearing 13 between a position of use G represented in FIG. 1, in which the coupling arm 20 protrudes substantially in front of a bumper 83 of the motor vehicle 80, and a position of non-use, where it is positioned on the motor vehicle 80 in particular concealed behind the bumper 83.

In the position of use G and preferably in the position of non-use N, the coupling arm 20 can be locked by means of a locking apparatus 15, for example by means of a force-fitting locking or the like. The locking apparatus 15 for example has force-fitting elements which can engage in a force-fitting manner into force-fitting receptacles 18 on the bearing body 14.

The coupling arm 20 can be unlocked by means of a drive 16 in order to be adjusted between the position of use G and the position of non-use N, for example to be pivoted or linearly displaced or both. Therefore, the bearing 13 is for example a pivot bearing, disc bearing or pivot disc bearing. However, this is not what matters primarily.

The coupling arm 20 can also be fixedly held on the holder 12, for example be connected detachably to the holder 12 by means of a screw connection, or by means of a push-in connection.

In order to adjust between the position of use G and the position of non-use N, a drive 17 is preferably provided which can also be designated as a swivel drive.

Figures 2, 3:
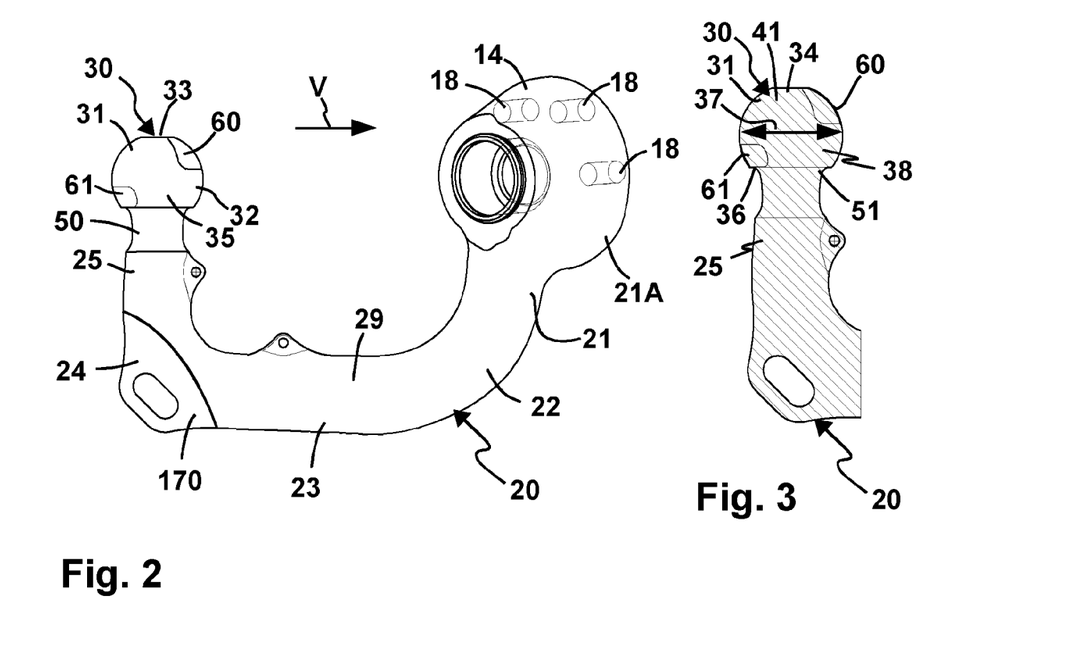
FIG. 2 shows a side view of a coupling arm and a coupling body of the trailer hitch according to FIG. 1.
FIG. 3 shows a longitudinal cross-section through a front part of the coupling arm and of the coupling body according to FIG. 2.

The coupling arm 20 has an arm body 26 with a longitudinal end 21, which is provided for connecting to the holder 12, i.e. forms a fastening element 21A or on which a fastening element 21A is arranged. For example, the arm body 26 is fixedly connected, in particular is in one piece, with the bearing element 14, for example a bearing head. The bearing element 14 is mounted so as to be pivotable and/or displaceable on the holder 12 for example by means of a bearing bolt.

A curvature section 22 adjoins the longitudinal end 21. The curvature section 22 is used so to speak in order that the coupling arm 20 can protrude upwards in the position of use G from under the bumper 83. A substantially straight running arm section 23 adjoins the curvature section 22, which merges into a further curvature section 24. It can be discerned that an adaptation to an outer contour of the motor vehicle 80 is realised by the curvature sections 22, 24 such that ultimately a coupling body 30, in particular a coupling ball 31, arranged on the end region 25 of the coupling arm 20 adjoining curvature section 24 of the coupling arm 20, has an upwards oriented alignment suitable for hitching a trailer or coupling a load carrier, for example the load carrier 90. The curvature section 22 serves to adapt to a bumper contour 84 of the motor vehicle 80.

A coupling device 93 of the load carrier 90, with which the load carrier 30 is fastened to the trailer hitch 10, in particular of the coupling body 30, acts, in the case of the drive operation of the motor vehicle 80 with coupled load carrier 90, with great force on the coupling arm 20, in particular in the region of the end region 25. A coupling body neck 50 is provided there with substantially cylindrical shape which is not necessary per se in this so to speak slim or narrow form for the operation with the load carrier 90, but for an operation with a trailer 190 or a coupling device 193 of the trailer 190, for example a so-called ball coupling.

Figure 4:
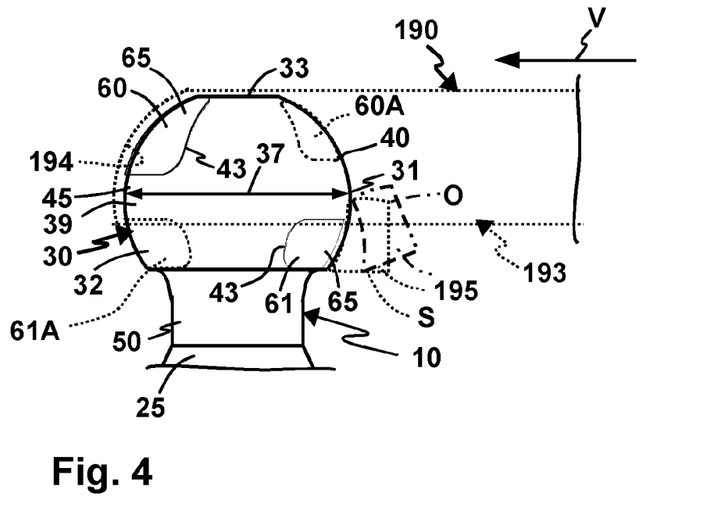
FIG. 4 shows a side view corresponding roughly to FIG. 1, but with a coupling device of a trailer coupled to the coupling body.

In order that the coupling device 193 namely has a sufficient rotational mobility in the manner of a ball joint on the coupling body, a corresponding free space is present under the coupling body 30, which is provided by the coupling body neck 50, whose outer diameter is smaller than that of the coupling body 30.

The coupling device 193 has a receptacle space 194, into which the coupling body 30 engages when the trailer 190 is coupled to the motor vehicle 80. The receptacle space 194 is sealable by a locking jaw 195 of the coupling device 193 such that the coupling body 30 is fixed in the receptacle space 194, but is received so as to be rotatable in a pivoting or spherically pivoting manner.

The locking jaw 195 is adjustable between an open position O, which is provided to remove the coupling device 193 from the coupling body 30, and a closed position S, in which the coupling device 193 is sealed or locked for the drive operation of the motor vehicle 80 with the trailer 190. The coupling body 30 is then received in the receiving space 193 in a spherically pivoting manner.

In the case of the load carrier 90, one or a plurality of bicycles F are fastened or can be fastened on its carrier structure 91, for example a carrier frame, which can be for example electric bicycles. Furthermore, there is a load carrier which can bear up to four bicycles. The load, which weighs on the load carrier 90 and acts via corresponds lever forces on the coupling arm 20, in particular the coupling body neck 50 and the transition between coupling body neck 50 and coupling body 30, is correspondingly heavy. If the effect is increased further by the load carrier 90 protruding further in front of the tail 82 of the motor vehicle 80, for example because the coupling device 93 is arranged on a correspondingly stretched carrier projection 92. This can in practice lead to for example the coupling body 30 or the coupling ball 31 breaking away from the coupling body neck 50.

The coupling ball 31 has a spherical surface 32, but has flattened portions, for example a flattened portion 33 on its upper side 34 and on its lower side 35 a further flattened portion 36, where the coupling ball 31 or the coupling body 30 is connected to the coupling body neck 50, for example connected in one piece therewith or screwed onto it.

The spherical surface 32 forms an outer surface of the coupling body 30 or of the coupling ball 31 in contact with the coupling device 93 or 193 during use of the coupling body 30 or the coupling ball 31. The flattened portion 33 and the flattened portion 36 are generally not in contact with for example the coupling device 193.

A connection site 51 is provided with the coupling body neck 50 on the flattened portion 36. Between the flattened portions 33 and 36, so to speak on the equator AQ of the coupling ball 31 running parallel to the flattened portions 33, 36, the coupling body 30 or the coupling ball 31 have a holding cross-section 37. In the case of a closed locking jaw 195, the coupling device 193 of the trailer 190 cannot be moved over this holding cross-section 37, i.e. the locking jaw 195 engages under the coupling ball 31 so to speak on their lower side 35. This is a safety measure.

Accordingly, it is advantageous when the basic material of a main body 38, which forms the coupling ball 31, is present in the region of the holding cross-section 37 and/or forms parts of the outer surface, in particular the spherical surface, of the coupling ball 31, i.e. none of the reinforcements or support elements mentioned below are provided there for example.

The holding cross-section 37 for example has a standard ball for the European region of at most 50 mm and at least 49 mm.

For example, the basic material of the main body 38 is in an equatorial region AB around the equator AQ without one of the reinforcements mentioned below and/or extends up to the outer surface of the coupling body.

Figure 7:
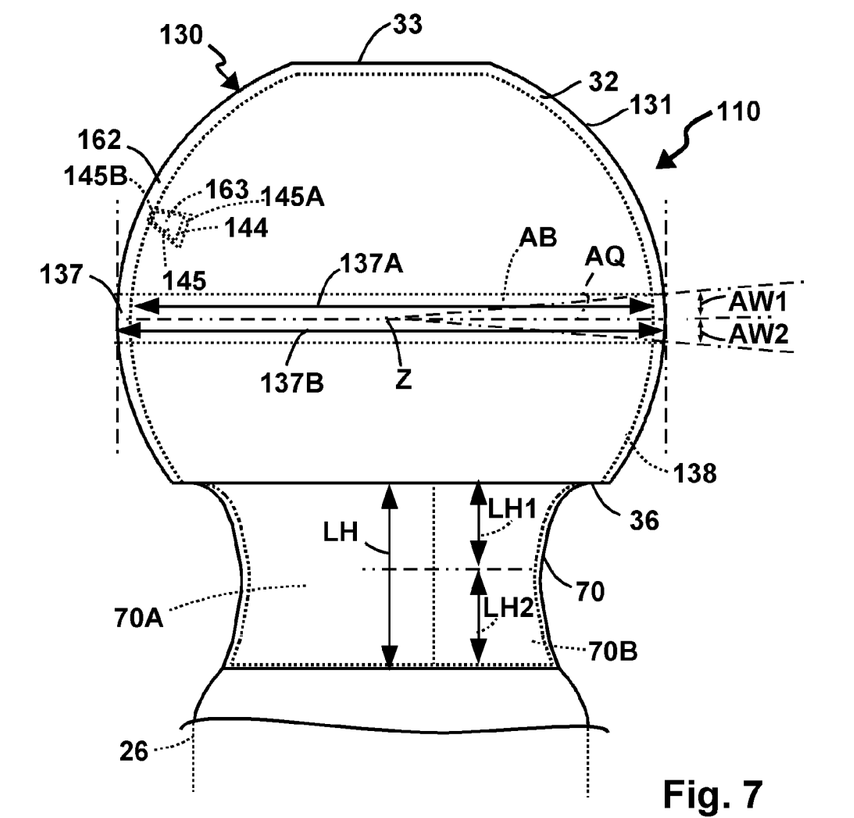
FIG. 7 shows a side view of a further exemplary embodiment of a trailer hitch according to the invention.

The equatorial region AB of the outer surface of the coupling body 30 or of the still to be explained coupling body 130 extends above and/or below the equator AQ, in particular in an angle range AW1 above the equator AQ and/or AW2 below the equator AQ. A respective angle forming the angle range AW1 or AW2 is for example 15° to 20° in relation to a centre Z of the coupling body 30, 130, or of the coupling ball 31.

Figure 5:
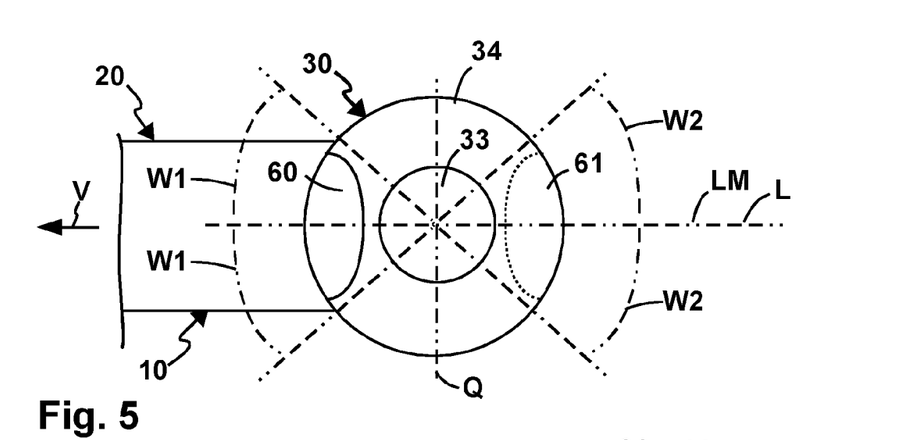
FIG. 5 shows a top view from above of a front part of the trailer hitch according to the preceding figures.

However, it has been found in practice that the coupling ball 31 has typical wearing zones. These wearing zones extend for example in an angle range W1 in relation to a longitudinal central axis L and an angle range W2 in relation to the longitudinal central axis L of the coupling body 30. The longitudinal central axis L runs parallel to the forwards direction of travel V of the motor vehicle 80 or to its longitudinal axial direction when the coupling arm 20 is in the position of use G. The longitudinal central axis L runs in a longitudinal central plane LM of the coupling body 30. The longitudinal central plane LM is for example at right angles to an equatorial plane AE, in which the equator of the coupling body 30 or of the coupling ball 31 is located.

The forward wearing zone in the direction of travel V is located on the upper side 34 of the coupling body 30, where corresponding forces act on the coupling body 30 in the case of tensile stress or tensile load of the trailer 190. Coupling body 30 rests there in the sense of pulling and supporting contact in the receptacle space 194 of the coupling device 193, which leads to increased wear. At the rear in the direction of travel, i.e. opposite to the forwards direction of travel V, the further wearing zone is located on the underside 35 of the coupling body 30, where the locking jaw 195 acts. Therefore, a partial wear of the coupling ball has been found in practice which is counteracted with the following measures.

A support element 60 is provided on the front part of the upper side 34, i.e. on the front side 39 of the coupling ball 31, while at the rear in the direction of travel, i.e. on the underside 35 or rear side 40 of the coupling body 30, a support element 61 is provided. Therefore, it is precisely here, where particular wear occurs during operation or pulling of the trailer 90, that a reinforced support element is provided.

The support elements 60, 61 extend for example in full or in part over the angle ranges W1 and W2, proceeding from the longitudinal central axis L of the coupling body 30. The angle ranges W1 and W2 are for example between 30 and 60 degrees.

Advantageously, the support elements 60, 61 are provided precisely at the points where, in practice or during the drive operation or trailer operation, particularly high loads and high wear occur. Thus, for example the support elements 60, 61 are provided for a first installed position of the fastening element 21A of the coupling arm of the trailer hitch 10 on the motor vehicle 80, for example at a first distance to a lane surface, as alternative support elements 60A, 61A which are provided for a second installed position of the fastening element 21A, which is for example higher or deeper than the first installed position. For example, the support elements 60A, 61A are provided for an off-road vehicle or SUV, while the support elements 60, 61 are provided for a correspondingly lower motor vehicle, for example a limousine or a station wagon.

However, there are no reinforcement measures or support elements provided on the coupling body 30 at right angles transverse to the longitudinal central axis L, i.e. in the region of a transverse axis Q. The holding cross-section 37 of the main body 38 of the coupling body 30 is so to speak directly available for supporting or holding the coupling device 93, 193 of the load carrier 90 or of the trailer 190.

Figure 6:
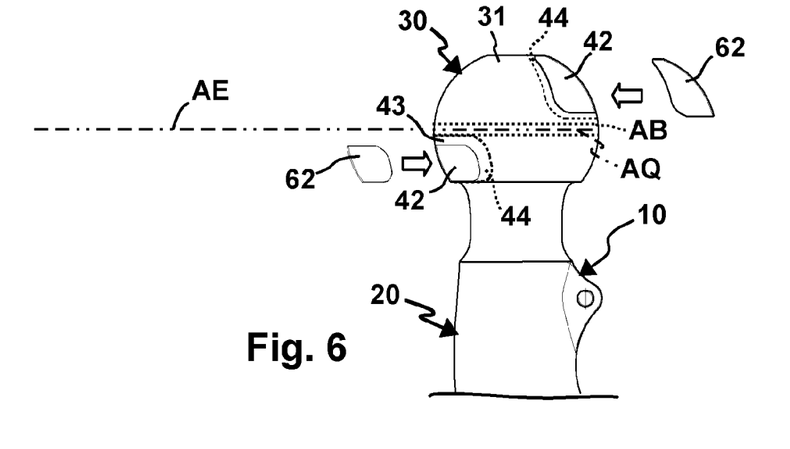
FIG. 6 shows an exploded representation of the trailer hitch according to the preceding figures with still unmounted support bodies.

The support element 60 and/or 61 is for example formed by a support body 62. The support body 62 can for example be adhered, welded or otherwise connected in a materially-bonded manner, for example even soldered to the main body 38 of the coupling body 30.

Recesses 42 for the support bodies 62 are for example present on the main body 38.

Outer surfaces 45 and 65 of the main body 38 and the support bodies 62 merge in a stepless manner into one another and/or align with one another at the edge region 43 such that they together form the homogenous spherical surface 32.

The support bodies 62 are for example made of ceramic, while a basic material 41 of the coupling body 30 is a metal basic material.

Undercuts 44, represented schematically and enlarged in the drawing, for example undercuts 44 extending transverse to the base surface of the respective receptacle 42 can be provided at the edge regions 43 of the recesses 42, into which undercuts a respective support body 62 engages such that a force-fitting hold of the support body 62 in the recess 42 and therefore on the coupling body 30 is provided.

The support body 42 can, however, also be applied or arranged in the recesses 42 by injecting, in particular thermally spraying or the like.

A further exemplary embodiment according to FIG. 7 in the case of a coupling body 130, which is configured as coupling ball 131, envisages a support body 162, which extends over the entire spherical surface 32 of the coupling ball 131. The support body 162 is for example provided as a coating of the main body 138 of the coupling body 130.

However, it is also alternatively possible that the support body 62 extends for example only over the equatorial region AB. In this case, it is advantageous when the equatorial region has a larger extension or elongation above and/or below the equator AQ. For example, in this case, the angles AW1 and/or AW2 are not only 15° to 20°, but rather advantageously roughly or at least 30°, roughly or at least 35°, particularly preferably roughly 45°.

The main body 138 is per se a spherical body with a diameter which is simultaneously also provided at its equatorial region AB. As a result, the main body 138 has a minimum holding cross-section 137A. In particular, it is advantageous when the entire or substantially the entire spherical surface 32 is provided with the support body 162. It is possible here that the upper flattened portion 33 and/or the lower flattened portion 36 is also provided with the support body or the support element which is formed by the support body. However, it is sufficient when for example only the spherical surface 32 is provided with the support body 62.

The support body 162 can engage into holding receptacles 145 of the main body 138 with one or a plurality of holding projections 163. The holding receptacles 145 have for example base surfaces 145A with a cross-section, which is greater than its penetration opening 145B for the holding projections 163 such that undercuts 144 are formed there.

The material thickness of the support body 162 now ensures that the coupling body 130 in the region of the holding cross-section 137A has an additional coating such that the main body 138 including the support body 162 forms a maximum holding cross-section 137B. The maximum cross-section 137B is for example 50 mm, while the minimum holding cross-section 137A is 49 mm or somewhat more, for example 49.2 mm.

Thus, if the support body 162 is now worn or destroyed in the region of the holding cross-section 137, the minimum holding cross-section 137A of the main body 138 is still available to hold the coupling device 93 or 193 such that it cannot be removed from the coupling body 130 in the closed state or in the state fastened on the trailer hitch 110.

Of course, the coupling arm 20 can also be reinforced in the manner according to the invention. It is particularly advantageous when for example the coupling body neck 50, in particular in the region of the connection site 51, has a support element 70. The support element 70 is for example formed by shot peening, hardening or by similar other compacting or hardening of a basic material 29 of a main body 28 of the coupling arm 20. The coupling body neck 50 for example has a substantially circular-cylindrical cross-section.

The support element 70 can comprise zones of different hardness, for example zones 70A, 70B. For example, the zone 70A is facing a longitudinal end 21 of the coupling arm 20 provided for fastening to the motor vehicle 80 and the zone 70A facing away from this longitudinal end 21. The zone 70A can be harder than the zone 70B or vice versa. It is also readily possible that only one of the zones 70A, 70B is provided, i.e. that in the region of the drawn-in zones 70A or 70B there is no support element or support measure provided.

Furthermore, it is possible that a support element extends only over a predetermined length of the coupling body neck 50 in relation to its longitudinal extension LH between the coupling arm 20 and the coupling body 30, for example only over a longitudinal section LH1 or a longitudinal section LH2. Thus, for example the support element 70 as a whole can extend only over the longitudinal section LH1 or the longitudinal section LH2. The zones 70A, 70B can also extend only over a part of the longitudinal extension LH of the coupling body neck 50.

In the region of the arm body 26, a support element, for example a support element 170, can also be provided in the region of one of the two curvature sections 22 and/or 24 particularly loaded during operation. For example, the basic material 29 of the coupling arm 20 is compacted in the region of the curvature section 24 by shot peening or similar other hardening measure to produce the support element 170.

It would be readily possible to use support bodies in the manner of the support bodies 62 or 162 in the coupling arm 20. It is also possible to provide the coupling arm 20 with a coating, for example in the region of the coupling body neck 50.

Figure 8:
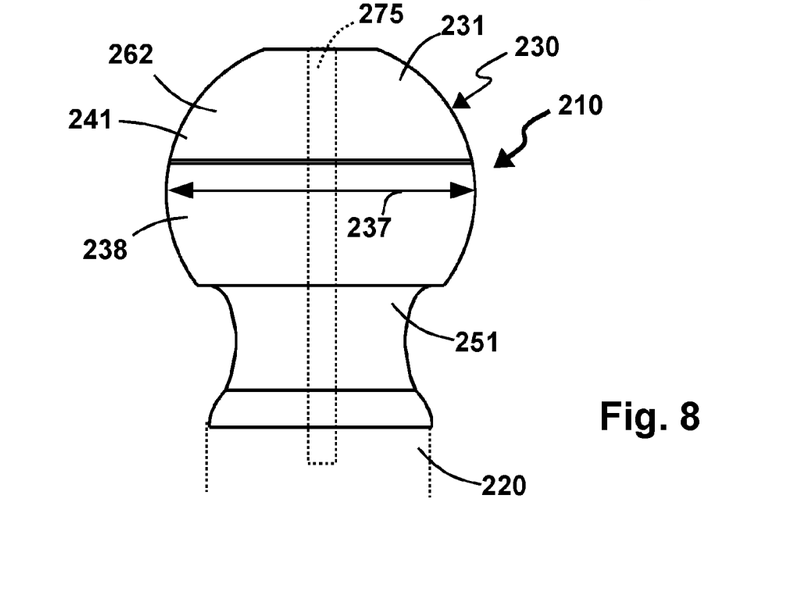
FIG. 8 shows a side view of a third exemplary embodiment of a trailer hitch according to the invention.

A coupling body 230 of a trailer hitch 210 is for example formed in multiple parts. A main body 238 forms for example a lower part of the coupling body 230, in particular a ball lower part of the coupling ball 231, which is formed in a complementary manner by a support body 262. The support body 262 is fixedly connected, for example welded, adhered or the like to the main body 238.

A connection element 275, for example a screw, passing through both the support body 262 and the main body 238, can serve to fasten the support body 262 to the main body 238. The connection element 275 can for example serve to connect the support body 262 and the main body 238 to a schematically represented coupling arm 220 of the trailer hitch 210.

The material of the support body 262 is harder and/or stronger than the basic material 241 of the main body 238. For example, the support body 262 consists of a ceramic material, while the main body 238 consists of metal. It is also possible that the support body 262 is formed of a harder metal than the main body 238.

Although the support body 262 is possibly somewhat more brittle or breakable than the main body 238, the coupling device 193 or 93 finds a strong hold on the coupling body 230 even when the support body 262 is damaged. The main body 238 extends namely from the connection site 251 of the coupling arm 220 with the coupling body 230 to a maximum holding cross-section 237 of the coupling body 230.

The invention claimed is:

1. A trailer hitch for a motor vehicle, wherein the trailer hitch has a coupling arm, on an end region of which a coupling body is arranged for hitching a trailer or coupling a load carrier to the motor vehicle, wherein at least one support element forming at least one part of a respective outer surface of the coupling body and/or of the coupling arm is provided on the coupling body and/or on the coupling arm, said at least one support element having a greater strength and/or hardness than a basic material of a main body of the coupling body or coupling arm on which the support element is arranged or which bears the support element; and
   wherein the at least one support element has a flat shape and provides at least 10% of a region of the outer surface of the coupling body, in contact with the load carrier or trailer when the trailer hitch is in use.

2. The trailer hitch according to claim 1, wherein the basic material in the region of the at least one support element is reinforced or hardened to form the support element.

3. The trailer hitch according to claim 1, wherein the basic material in the region of the at least one support element is hardened.

4. The trailer hitch according to claim 1, wherein the basic material in the region of the at least one support element is reinforced or hardened by mechanical action.

5. The trailer hitch according to claim 1, wherein the basic material in the region of the at least one support element is formed by shot peening and/or rolling and/or milling.

6. The trailer hitch according to claim 1, wherein the basic material in the region of the at least one support element is provided on a support body, which is fixedly connected to the main body of the coupling arm or coupling body and is formed by a material which has a greater strength and/or hardness than the basic material of the main body.

7. The trailer hitch according to claim 1, wherein the support body is a wall body which is arranged in the manner of an outer wall on the main body and/or surrounds the main body in a shell-like manner and/or the support body is configured as a shell body formed in particular in the manner of a spherical casing.

8. The trailer hitch according to claim 6, wherein the at least one support body and the main body of the coupling body or coupling arm form the respective outer surface of the coupling body or coupling arm in a complementary manner, wherein outer surface elements of the support body and of the main body are arranged next to one another and/or adjoin one another and/or merge into one another in a stepless manner.

9. The trailer hitch according to claim 6, wherein the main body of the coupling body and of the support bodies form the coupling body in a complementary manner and/or have a disc section and/or a spherical segment section and/or are configured as a spherical segment and/or spherical body parts.

10. The trailer hitch according to claim 6, wherein the support body is connected to the main body in a materially-bonded manner, in particular adhered and/or soldered and/or welded.

11. The trailer hitch according to claim 6, wherein the support body is held on the main body in a force-fitting manner and/or is screwed with the main body.

12. The trailer hitch according to claim 6, wherein the support body is connected to the main body by means of at least one holding projection or holding pin which protrudes in front of the support body or the main body and engages into a receptacle on the other of support body and main body respectively.

13. The trailer hitch according to claim 6, wherein the support body is held on the main body by means of at least one undercut.

14. The trailer hitch according to claim 13, wherein the undercut is provided at an edge region between the support element and an outer surface element of the main body such that the support body and the main body engage into one another in a force-fitting manner.

15. The trailer hitch according to claim 6, wherein the support body or the at least one support element is formed by a coating of the main body.

16. The trailer hitch according to claim 15, wherein the coating is formed by thermal spraying and/or a casting process.

17. The trailer hitch according to claim 1, wherein the support element comprises or is formed by a ceramic material, in particular from the field of technical ceramics, and/or a metal alloy, in particular based on nickel/chrome.

18. The trailer hitch according to claim 1, wherein the basic material of the main body of the coupling body has an in particular minimal holding cross-section provided on its equatorial region which prevents removal of a coupling device of the trailer or load carrier from the coupling body when the coupling device adopts its locked and/or closed position provided for the drive operation of the trailer with the motor vehicle.

19. The trailer hitch according to claim 1, wherein the at least one support element does not extend up to the minimal holding cross-section and/or the basic material of the coupling body main body in the region of the minimal holding cross-section forms the outer surface of the coupling body.

20. The trailer hitch according to claim 1, wherein the at least one support element covers the coupling body in the region of the minimal holding cross-section on the outer side with such a material thickness that the coupling body has a maximum holding cross-section in the case of which the coupling device of the trailer or load carrier is adjustable into a coupling position provided to hold the trailer or load carrier for a drive operation, in which the coupling body is received in a coupling receptacle of the coupling device.

21. The trailer hitch according to claim 1, wherein the at least one support element comprises an upper support element on an upper side of the coupling body facing away from a connection site of the coupling body with the coupling arm above a maximum cross-section of the coupling body and/or a lower support element on a lower side facing a connection site of the coupling body with the coupling arm, in particular below a maximum cross-section of the coupling body.

22. The trailer hitch according to claim 1, wherein the upper support element is facing a longitudinal end of the coupling arm provided for fastening on the motor vehicle and/or the lower support element is facing away from a longitudinal end of the coupling arm provided for fastening on the motor vehicle.

23. The trailer hitch according to claim 21, wherein the lower support element is facing a longitudinal end of the coupling arm provided for fastening on the motor vehicle and/or the upper support element is facing away from a longitudinal end of the coupling arm provided on the motor vehicle.

24. The trailer hitch according to claim 21, comprises only one single upper support element on the upper side of the coupling body, and/or only one single lower support element on the lower side.

25. The trailer hitch according to claim 1, wherein the at least one support element comprises a support element on the coupling body, which extends over an angle range of maximum 70°, laterally next to a longitudinal central axis which is parallel to a main longitudinal axis of the coupling arm and/or is parallel to the vehicle longitudinal axis of the motor vehicle in the state of the trailer hitch mounted on the motor vehicle.

26. The trailer hitch according to claim 1, wherein first partial surfaces of a region of the outer surface of the coupling body, in contact with the load carrier or trailer when the trailer hitch is in use, is formed by the basic material of the main body of the coupling body, and second partial surfaces of the region of the outer surface of the coupling body, in contact with the load carrier or trailer when the trailer hitch is in use, is formed by the at least one support element or an arrangement of a plurality of support elements comprising at least one support element.

27. The trailer hitch according to claim 26, wherein a total surface extension of the second partial surfaces is smaller or greater than a total surface extension of the first partial surfaces.

28. The trailer hitch according to claim 1, wherein the coupling arm has an arm body and a coupling body neck which is arranged between the arm body and the coupling body.

29. The trailer hitch according to claim 1, wherein the at least one support element comprises a support element on the neck section and/or on an end region of an arm body bearing a coupling body neck.

30. The trailer hitch according to claim 1, wherein a material thickness of the at least one support element is lower in a transition region to the outer surface of the main body of the coupling arm or coupling body than at a greater distance from the transition region.

31. The trailer hitch according to claim 1, wherein the at least one support element comprises a support element on the coupling arm, wherein the support element in the region of its outer surface has a greater hardness and/or strength than in the direction of a cross-sectional centre of the coupling arm.

32. The trailer hitch according to claim 1, wherein the coupling body and the coupling arm are one piece or in that the coupling body is a component separate from the coupling arm which is fastened to the coupling arm by means of fastening means.

33. Method for producing a trailer hitch for a motor vehicle, wherein:
   the trailer hitch has a coupling arm, on an end region of which a coupling body is arranged for hitching a trailer or coupling a load carrier to the motor vehicle, wherein by producing at least one support element forming at least one part of a respective outer surface of the coupling body and/or the coupling arm on the coupling body and/or the coupling arm, wherein the support element has a greater strength and/or hardness than a basic material of a main body of the coupling body or coupling arm on which the support element is arranged or which bears the support element;
   the at least one support element has a flat shape and provides at least 10% of a region of the outer surface of the coupling body, in contact with the load carrier or trailer when the trailer hitch is in use.

34. A trailer hitch for a motor vehicle, comprising:
   a coupling arm;
   a coupling body on an end region of the coupling arm;
   at least one first support element forming part of an outer surface of the coupling arm, the first support element having a greater strength and/or hardness than a basic material of the coupling arm;
   at least one second support element forming part of an outer surface of the coupling body, the second support element having a greater strength and/or hardness than a basic material of the coupling body; and
   a first partial surfaces of a region of the outer surface of the coupling body, in contact with the load carrier or trailer when the trailer hitch is in use, is formed by the basic material of the main body of the coupling body, and a second partial surfaces of the region of the outer surface of the coupling body, in contact with the load carrier or trailer when the trailer hitch is in use, is formed by the at least one support element or an arrangement of a plurality of support elements comprising at least one support element.

* * * * *